June 22, 1937. P. L. MANN 2,084,771
AUTOMOBILE RADIO ANTENNA
Filed Feb. 8, 1936 2 Sheets-Sheet 1
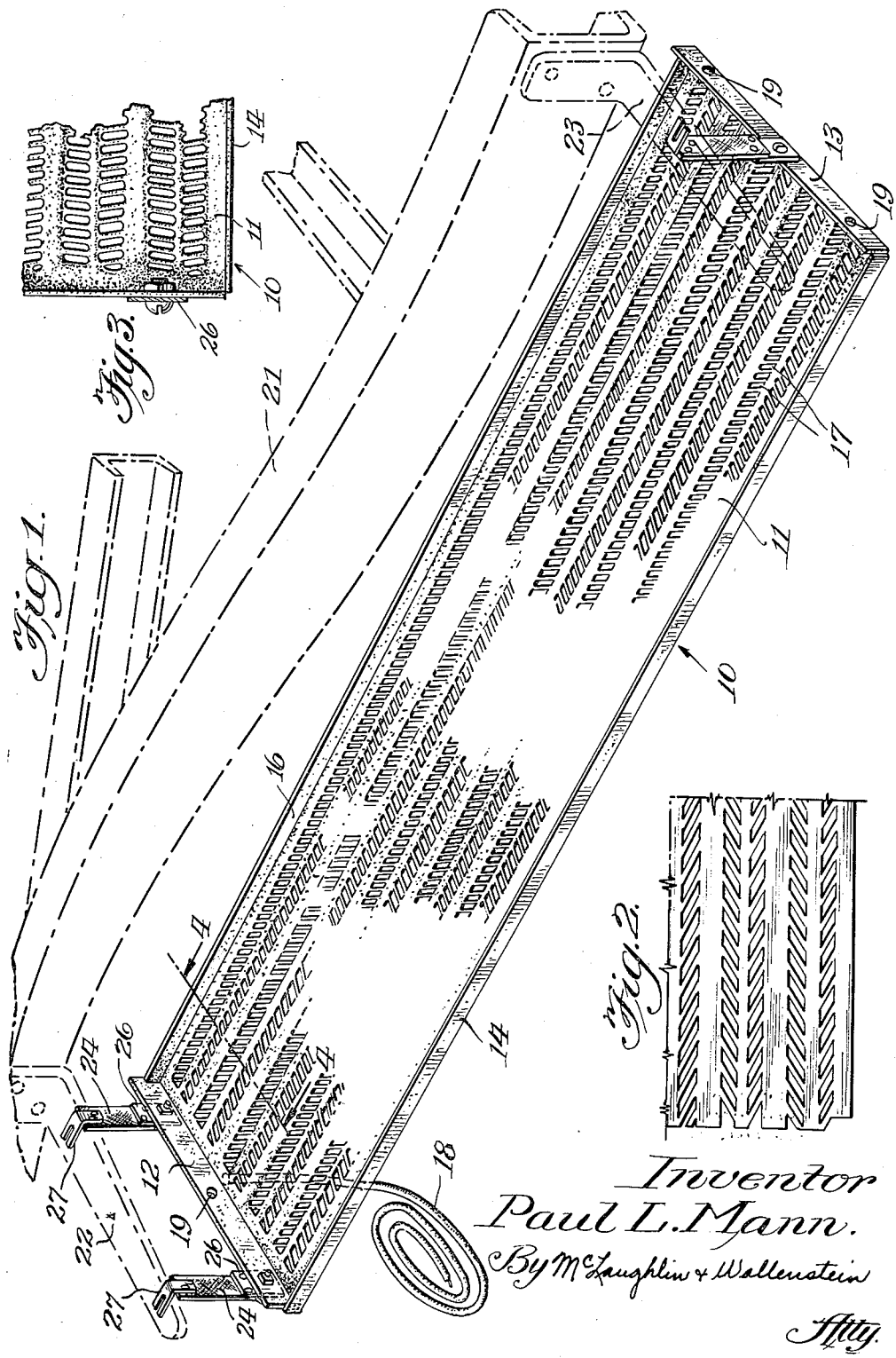
Inventor
Paul L. Mann.
By McLaughlin & Wallenstein
Atty.

June 22, 1937. P. L. MANN 2,084,771
AUTOMOBILE RADIO ANTENNA
Filed Feb. 8, 1936 2 Sheets-Sheet 2
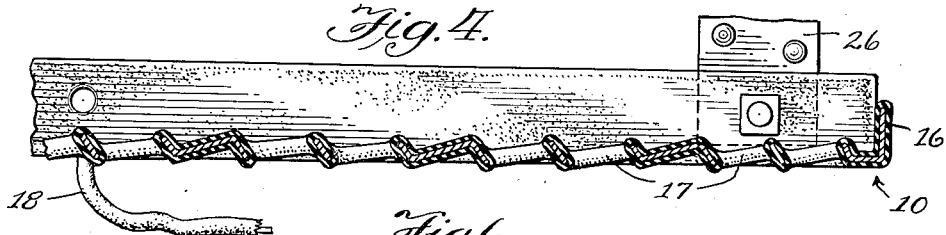
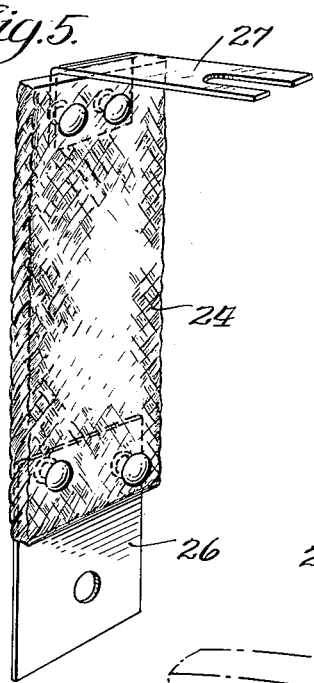
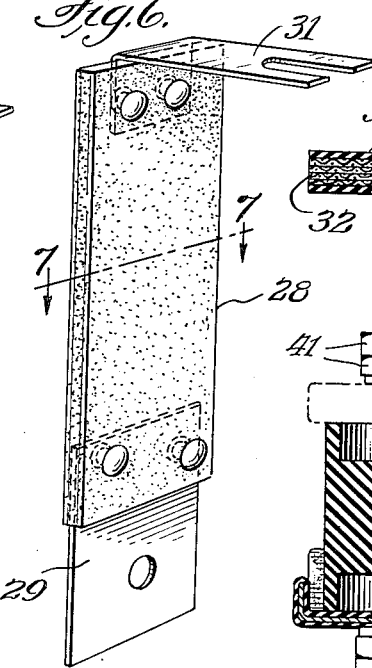
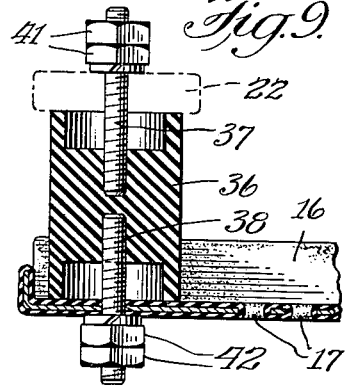
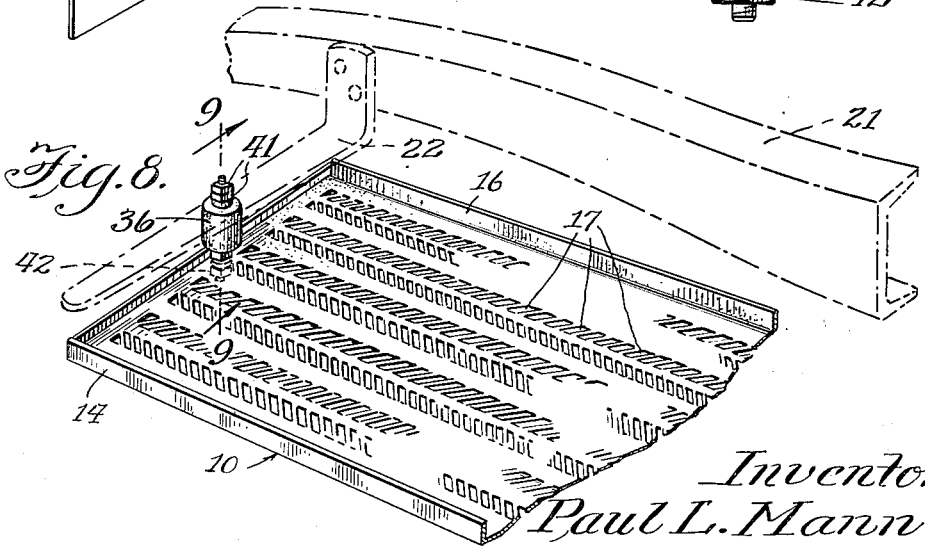
Inventor
Paul L. Mann.
By McLaughlin & Wallenstein
Atty.

Patented June 22, 1937

2,084,771

UNITED STATES PATENT OFFICE 2,084,771

AUTOMOBILE RADIO ANTENNA

Paul L. Mann, Chicago, Ill., assignor to Consolidated Wire and Associated Corporations, Chicago, Ill.

Application February 8, 1936, Serial No. 62,880

4 Claims. (Cl. 250—33)

My invention relates in general to radio antennae and more in particular to automobile radio antennae.

Although enormous strides have been made in the last few years in improving radio reception in automobile radios, there is still considerable to be desired. One of the difficulties is the extremely careful installations that as a rule are necessary to secure proper reception, without interference. The antennae used in the automobile have caused intereference, and in addition they have had serious disadvantages in still other respects. The general run of automobile antennae have either been mounted within the automobile, as, for example, in the roof of the car, or they have been mounted exteriorly of the automobile in the form of composite, insulated strips which have been mounted beneath the running gear of the car. Although it is customary to use springs at at least one end of these antennae to hold them in a substantially taut position, results with this type of installation have been, from both the reception and mechanical viewpoint, unsatisfactory.

The principal object of my invention is the provision of an improved automobile antenna.

Another object is the provision of an automobile antenna which may be mounted in any type of automobile with substantially no regard to the design, style of construction, or mechanical features thereof.

Another object is the provision of an automobile antenna which will improve radio reception and minimize interference.

Another object is the provision of improved means for mounting an automobile radio antenna.

Other objects and features of the invention will be apparent from a consideration of the following detailed description taken with the accompanying drawings, wherein Fig. 1 is an isometric view showing one embodiment of my antenna mounted in position, portions of the automobile being shown in dotted lines to indicate the mounting means employed;

Fig. 2 is an enlarged fragmentary sectional view showing the construction of the antenna itself;

Fig. 3 is an enlarged fragmentary view showing a mounting feature;

Fig. 4 is a fragmentary sectional view taken on the line 4—4 of Fig. 1, looking in the direction of the arrows;

Figs. 5 and 6 are perspective views showing mounting brackets employed;

Fig. 7 is a sectional view taken on the line 7—7 of Fig. 6;

Fig. 8 is a fragmentary view showing another form of support; and

Fig. 9 is an enlarged sectional view taken on the line 9—9 of Fig. 8, showing the mounting means in detail.

According to the main features of the invention, I provide a single-piece metal structure, so designed as to give a relatively large surface, and covered with an insulating material, preferably live rubber, electrolytically deposited on the surface of the metal. A lead-in wire has one end secured integrally to the metal portion of the antenna and is also rubber covered so that the insulation from the antenna runs to the lead-in wire without a break. The antenna is secured beneath the automobile preferably under the running board by means of suitable mounting brackets, and in such a way as to form a secure support. Due to the character of the antenna itself, the support therefor and the arrangement of the lead-in wire, interference is decreased materially and the installation will remain permanent, barring of course accidents, which are beyond control of the designer of the radio equipment.

Referring now to the antenna structure, indicated generally by the reference character 10, this comprises a body portion 11, upturned or flange end portions 12 and 13, and right angular side portions 14 and 16. The metal portion of the antenna is preferably a single piece of metal formed from a flat sheet. The main body portion is formed to produce a web with open spaces 17 between the successive sections of web. This construction is shown in considerable detail in Figs. 3 and 4, particularly the latter figure. By means of this construction, a rigid antenna is produced, capable of withstanding all manner of road shocks and even a considerable portion of stress and strain, without being distorted in any way. Should it be distorted, however, the pickup characteristics of the antenna are not appreciably affected, because there are no joints or connections which might become loosened and produce interference noises.

The integral metal body of the antenna is suitably covered with an insulating material. I have obtained the best results with a live rubber covering which is electrolytically deposited in a uniform layer over the entire exposed surface of the metal. The rubber so deposited is relatively plastic, that is to say, will readily bend and may be subjected to blows, as, for example, from stones or pebbles picked up by the tires of the automobile, without being injured. Moreover, it protects the underlying metal portion mechanically as well as electrically.

The lead-in wire 18 has one end rigidly secured, as, for example, by brazing, to the metal portion of the antenna. This lead-in wire is also rubber covered, at least the portion of the wire closest to the antenna having the rubber applied at the same time the rubber is applied to the antenna proper, whereby a continuous insulation coating is provided for the antenna and lead-in wire.

The end portions 12 and 13 of the antenna are provided with holes 19 which are employed for mounting the antenna in position. These holes are formed before the antenna is rubber coated so that the inside of the holes is provided with insulation so as to still further insulate the antenna against leakage as, for example, when a metal bolt is employed through the holes or openings 19.

The antenna is mounted beneath the automobile, preferably beneath the running board. In Figure 1 I illustrate schematically a portion of the frame or chassis 21 to which are secured a pair of angle brackets 22 and 23 for mounting the antenna in place. These mounting brackets may be and preferably are the usual support provided for the running board. The running board is not shown in the drawing because it is not necessary to an understanding of the invention and to show it would conceal the supports and require additional figures which would tend to complicate rather than facilitate the disclosure.

In the support shown in Figures 1, 4 and 5, I utilize a special multi-ply fabric strap 24 to one end of which is riveted perforated mounting plate 26 and to the other end of which is secured an angular mounting bracket 27. This bracket is designed to be slipped, for example, between the running support of the running board proper and is provided with bifurcations which engage on opposite sides of a bolt, for example, by means of which the running board is secured to its support. This bolt can be tightened up after the bracket is engaged in position so that the bracket is rigidly held against slippage. The plate is attached to one of the flanges 12 and 13 of the antenna proper by means of a bolt and nut. The bolt extends through a hole provided in the plate 26 and one of the holes 19 of the antenna.

As indicated in Figure 1, two of these mounting straps may be employed at one end of the antenna and one at the other end, or, if desired, either two or three may be supplied at each end, depending upon the arrangement of the automobile and the support which appears to be necessary in accordance with the particular installation being made.

In Figures 6 and 7 I show still another form of support, including a composite insulated strap 28, plate 29, and a bracket 31. This strap 28 differs from the strap 26 in that it comprises a plurality of laminations 32 of fabric and an outer covering 33 of rubber. Like the strap 24, the strap has the advantage of offering the maximum of resistance to leakage from the antenna to the metal frame of the automobile and also of being sufficiently flexible to permit ready mounting. The provision of the rubber, however, stiffens the strap somewhat and there is less tendency to swaying of the antenna than with the embodiment shown in detail in Figure 5.

In place of a hanging support I may provide a rigid support as shown in Figures 8 and 9. In this form I utilize a generally cylindrical insulating block 36 fabricated from a suitable insulated molding material, such as a phenolic resin or other condensation product. The block is provided with a pair of axially disposed end apertures threaded to receive bolts 37 and 38. These bolts may be threaded into the block 36 or they may have their ends embedded in the block by having the block molded around them. The uppermost part of bolt 37 is adapted to extend through a support, and a pair of nuts 41 including a lock nut, lock washer or other locking means which may be used to produce a firm engagement. The bolt 38 extends through one of the apertures in the antenna and is also provided with suitable nuts 42 to hold the antenna in position tightly against the block 36. It will be noted that the block 36 is provided with a pair of shallow end apertures, resulting in the production of an annular flange at each end of the block. This construction has the advantage of assuring a firmer support in that the annular flange is aligning and engages around its entire periphery. In addition, leakage is cut down by this construction and the electrical properties of the antenna improved. By means of this construction and support means the antenna can be mounted rigidly in position.

What I claim as new and desire to protect by Letters Patent of the United States is:

1. An automobile antenna comprising a substantially single-piece, uniplanular metal body having a lattice-like construction and shaped to fit beneath the running board of an automobile, a lead-in wire secured to the metal body, and a continuous electrolytically-deposited, flexible, live rubber coating covering the entire surface of said metal body and the juncture of the lead-in wire with said metal body.

2. An automobile antenna comprising a substantially single-piece, uniplanular metal body having a lattice-like construction and shaped to fit beneath the running board of an automobile, flanged end portions connected to said metal body and provided with apertures through which mounting brackets may be secured, a lead-in wire secured to the metal body, a continuous, electrolytically-deposited, flexible, live rubber coating covering the entire surface of said metal body, the flanged end portions, and the juncture of the lead-in wire with said metal body, and insulated means for supporting said antenna beneath the running board of the automobile.

3. The antenna described in claim 1 including antenna supporting means comprising semi-flexible straps which serve to facilitate mounting of the antenna in place and prevent substantial swaying of the antenna while the automobile is in motion.

4. The process of making radio antennae for automobiles comprising providing a substantially single-piece, uniplanular metal body having a lattice-like construction and shaped to fit beneath the running board of an automobile, securing a lead-in wire and flanged end portions to said metal body, and then electrolytically depositing a coating of flexible, live rubber over the entire surface of the metal body, the flanged end portions and the juncture of the lead-in wire with the metal body whereby the antenna is electrically and mechanically protected.

PAUL L. MANN.